United States Patent [19]

Murray

[11] Patent Number: 4,484,064
[45] Date of Patent: Nov. 20, 1984

[54] COFFEE ROASTER

[76] Inventor: Jerome L. Murray, 652 First Ave., New York, N.Y. 10016

[21] Appl. No.: 401,635

[22] Filed: Jul. 26, 1982

[51] Int. Cl.³ .......................... F26B 3/08; F27D 7/04
[52] U.S. Cl. ........................................ 219/400; 34/10; 99/474; 99/469; 426/467
[58] Field of Search ................. 219/400; 99/469, 474, 99/476, 475; 426/466, 467, 469; 34/10

[56] References Cited

U.S. PATENT DOCUMENTS

| | | | |
|---|---|---|---|
| 2,172,603 | 9/1939 | Adams | 99/469 |
| 2,212,120 | 8/1940 | Kneale | 426/467 |
| 2,241,754 | 5/1941 | Wilsey | 99/475 |
| 3,122,439 | 2/1964 | MacAllister | 426/467 |
| 3,228,774 | 1/1966 | Sanders | 99/475 |
| 3,329,506 | 7/1967 | Smith | 426/467 |
| 3,964,175 | 6/1976 | Sivetz | 426/467 |

FOREIGN PATENT DOCUMENTS 672887  10/1963  Canada ............................... 426/467

Primary Examiner—C. L. Albritton
Assistant Examiner—Teresa J. Walberg
Attorney, Agent, or Firm—Curtis, Morris & Safford

[57] ABSTRACT

A coffee roaster suitable for use in the home and/or retail establishments includes a container where initially green unroasted coffee beans are levitated while heated air is forced through the beans to roast the beans to a desired degree. The container is shaped to allow continuous rotation of the beans to avoid charring and uneven roasting. The warm air is circulated in a closed circulation loop and, after roasting is completed, cool ambient air is circulated through the beans to cool them. An optional companion grinder is provided to grind the fresh roasted beans for immediate coffee brewing.

9 Claims, 5 Drawing Figures

COFFEE ROASTER

FIELD OF THE INVENTION

The present invention relates to coffee roasters and more particularly to a coffee roaster which effectively and efficiently roasts small quantities of coffee for immediate grinding and coffee brewing.

BACKGROUND OF THE INVENTION

It has long been recognized that the freshest, most aromatic and tasteful brewed coffee results when the raw or green coffee beans are roasted, ground and brewed as a coffee beverage as soon as possible. This is true because once roasted and ground, coffee quickly loses its essence, aroma and flavor.

The green unroasted coffee bean has a film-like covering which effectively excludes air and protects the beans against deterioration which affects flavor and aroma. This protecting film or covering on the coffee beans is removed during the roasting of the coffee beans as chaff, a flaked, dried film skin. The removal of this film covering leaves roasted beans exposed to undesirable deterioration. An unground roasted bean will retain much of its flavor and aroma for up to three months but then the flavor and aroma in the form of carbon dioxide evaporates from the bean. Ground beans exhibit a more rapid deterioration and once a vacuum packed can of ground coffee has been opened, significant flavor deterioration results in less than a week.

Additional flavor deterioration results because roasted coffee beans have an oily content and exposure to air materially alters the chemical makeup of these coffee oils resulting in a deterioration of flavor and aromatic attributes.

Small volume coffee roasters have been proposed heretofore but none of these prior proposals have found wide commercial acceptance. Such prior proposals for small volume coffee roasters are shown in U.S. Pat. Nos. 1,896,230, 1,985,604, 2,109,597, 2,154,963, 2,360,838, 2,413,687, 2,581,148, 2,906,193, 3,153,377 and 4,196,342. None of these prior art devices utilize the principal of the present invention which effectively and uniformly roasts green coffee beans to a desired roast degree.

One of the problems associated with the roasting of coffee beans is to insure that the temperature of the beans is carefully controlled to avoid elevating the temperature of the beans to an excessive degree. Coffee beans when elevated to too high a temperature exhibit a charcoaling effect in that the beans rapidly heat, ignite and glow much like heated charcoal. Another problem associated with roasting coffee beans is to insure an even and uniform roast of the beans so that the beans are uniformly roasted throughout. A still further problem in roasting coffee beans is to have an effective chaff removal. Chaff forms through the latter stages of a coffee roasting and is the residue of the protective film coating surrounding a green coffee bean.

Another problem associated with the roasting of coffee beans is to insure effective chaff removal. While the chaff content of coffee beans is less than 1% it is best to remove as much of the chaff as possible as chaff which remains with the ground coffee results in a brewed coffee beverage with a bitter taste.

Another problem associated with coffee roasting results when it is desired to blend coffee to achieve the benefit of a selection of various types of coffee beans for a particular desired coffee taste. When different coffee beans are involved, uniformity of roast presents problems as coffee beans are a commodity with variables similar to wine grape harvests. Thus the roasting of each batch must be carefully controlled. Because of differences in bean size, density, origin and other factors, commercial roasters are forced to roast each type of bean separately and then blend the roasted beans prior to grinding to achieve the desired coffee blend.

Accordingly, it is an object of the present invention to provide a simple yet effective apparatus to roast relatively small quantities of green coffee beans.

It is a further object of this invention to provide a coffee roasting apparatus for roasting small quantities of green coffee in an efficient and uniform manner to insure the obtainment of a flavorful and aromatic brewed coffee beverage.

A still further object of the present invention is to provide an efficient coffee roasting apparatus to impart a uniform roast to the coffee beans and to provide for a selection of a desired degree of roasting.

Yet another object of the present invention is to provide a coffee roasting apparatus with an effective and efficient chaff removal feature to insure an optimum brewed coffee taste.

A still further object of the present invention is to provide a coffee roaster in which a variety of different types of coffee beans, may be roasted at the same time.

DESCRIPTION OF THE PREFERRED EMBODIMENT

Figure 1:
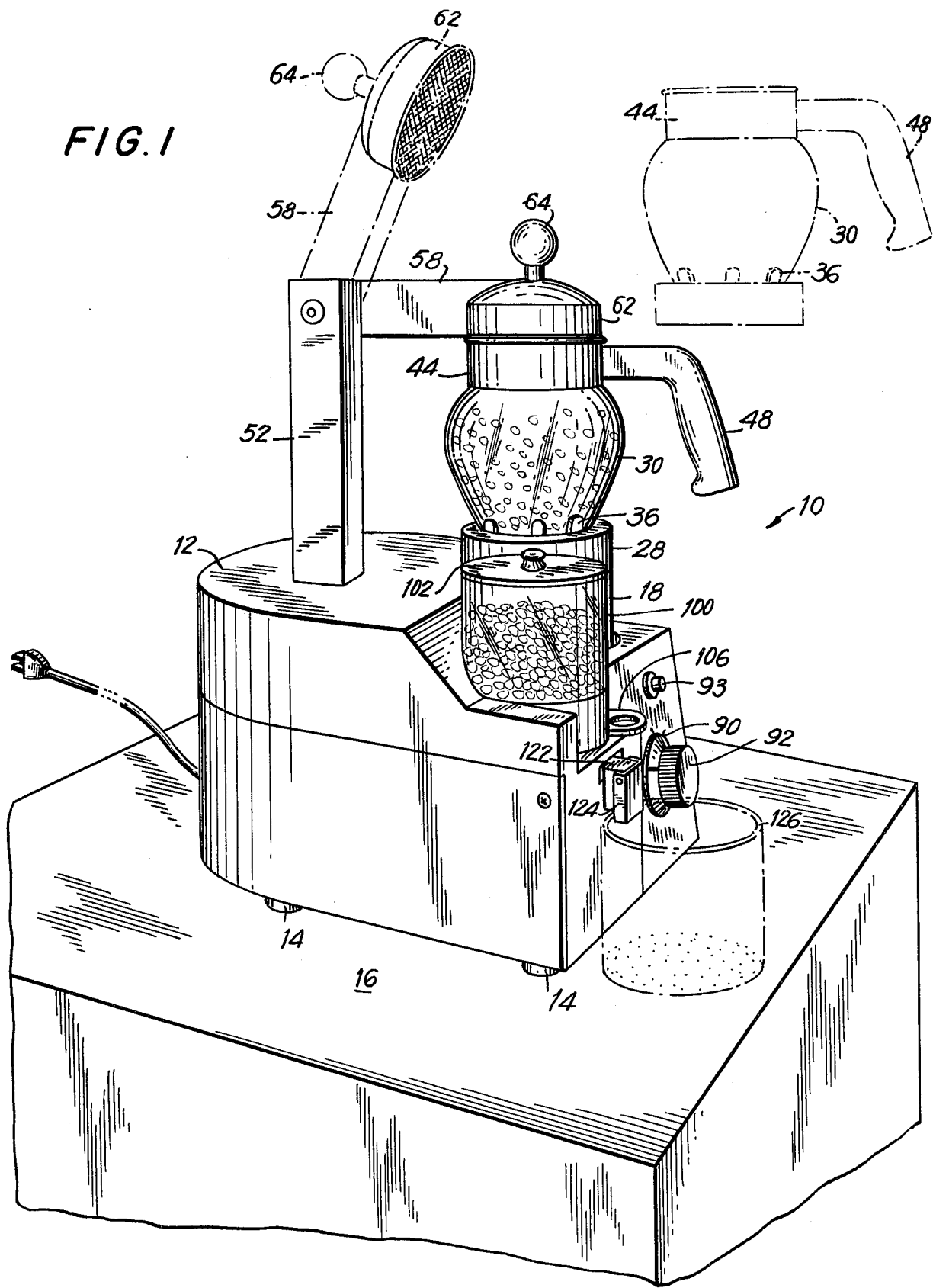
FIG. 1 is a perspective view showing a representation of the coffee roaster according to the present invention shown in combination with a companion, optional coffee grinder.
Figure 2:
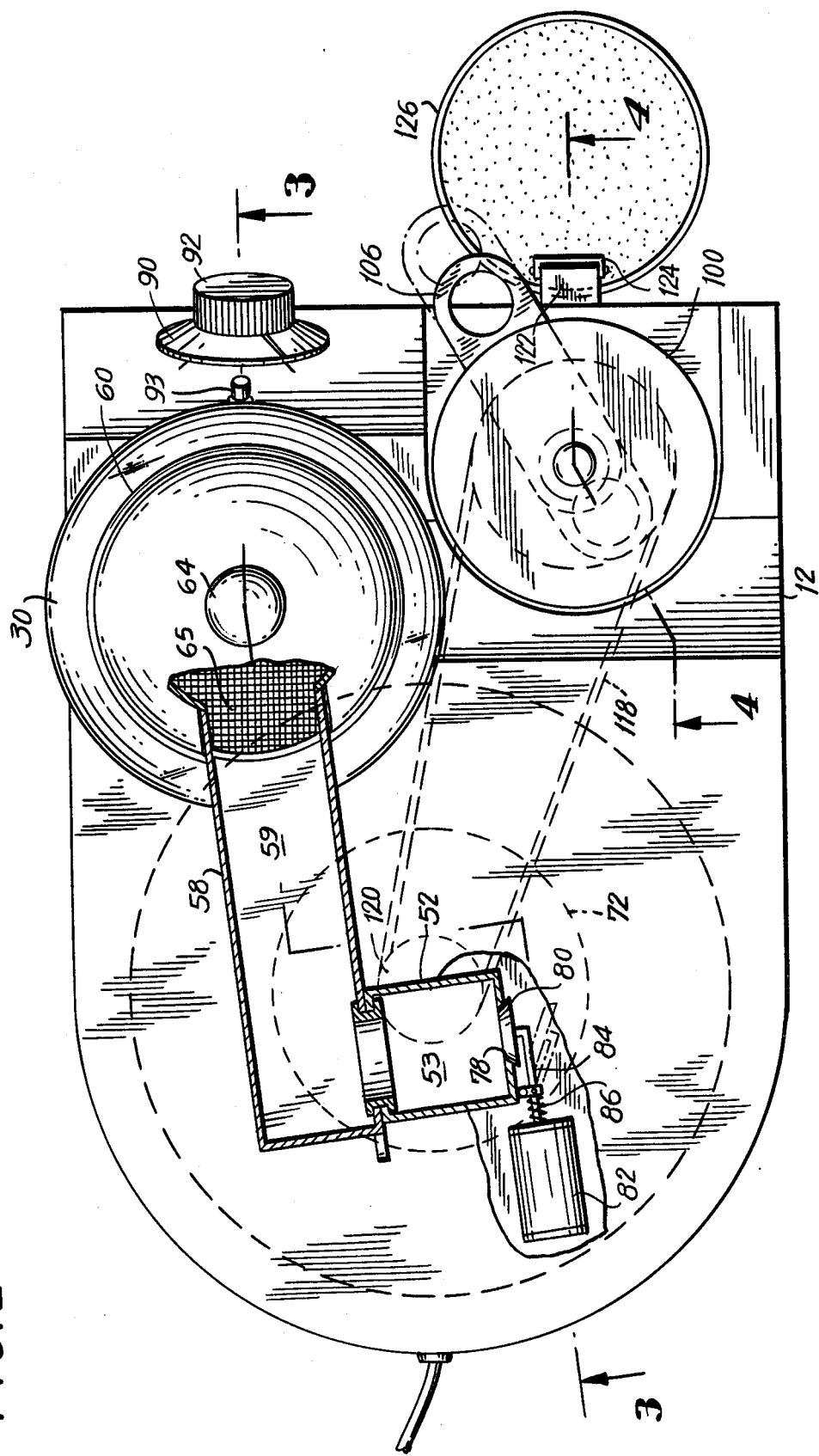
FIG. 2 is a plan view partly in section showing a roaster of the present invention.

With reference to the drawing, the coffee roaster 10 of the present invention includes a base housing 12 preferably mounted on rubber feet 14 to elevate the housing slightly from a work surface 16. A cylindrically shaped support housing 18 extends upwardly from base housing 12 and the open end 20 of cylindrical housing 18 is capped by a circular mesh screen 22 which preferably snaps onto the upper peripheral edge of housing 18. Screen 22 may be any type of standard mesh screen for example a 16×18 mesh. A cylindrically shaped retaining ring 24 having an inwardly flanged projection 26 and a depending skirt segment 28 fits over the open end of housing 18.

Screen 22 provides a supporting surface for a coffee bean holding vessel 30. Vessel 30 is preferably of a clear heat resistant glass or plastic such as "Pyrex" and includes an open bottom section 32 closed by a snap-on mesh screen 34. Screen 34 may also be a standard mesh screen, for example, 16×18, and includes a peripheral retainer ring segment having circumferentially spaced upstanding lugs 36 which snap over the lowermost peripheral surface of retaining vessel 30.

Vessel 30 itself is shaped to have a lowermost uniformly inwardly inclined lower segment 38, the outside surface of which is the mating bearing surface for the snap-on lugs 36. The wall of vessel 30 then proceeds upwardly in a smoothly outwardly inclined segment 40 and then curves centrally inwardly uniformly in an upper segment 42 terminating in a short cylindrical segment 44 at its upper end. The shaped is essentially that of a bell in cross-section. An external metal band 46 circumscribes the cylindrical segment 44 and a convenient holding handle 48 is secured to the circumferential band 46. With the snap-on screen 34 in place over the open bottom end of vessel 30 a quantity of green unroasted coffee beans 50 may be retained in vessel 30.

Figure 3:
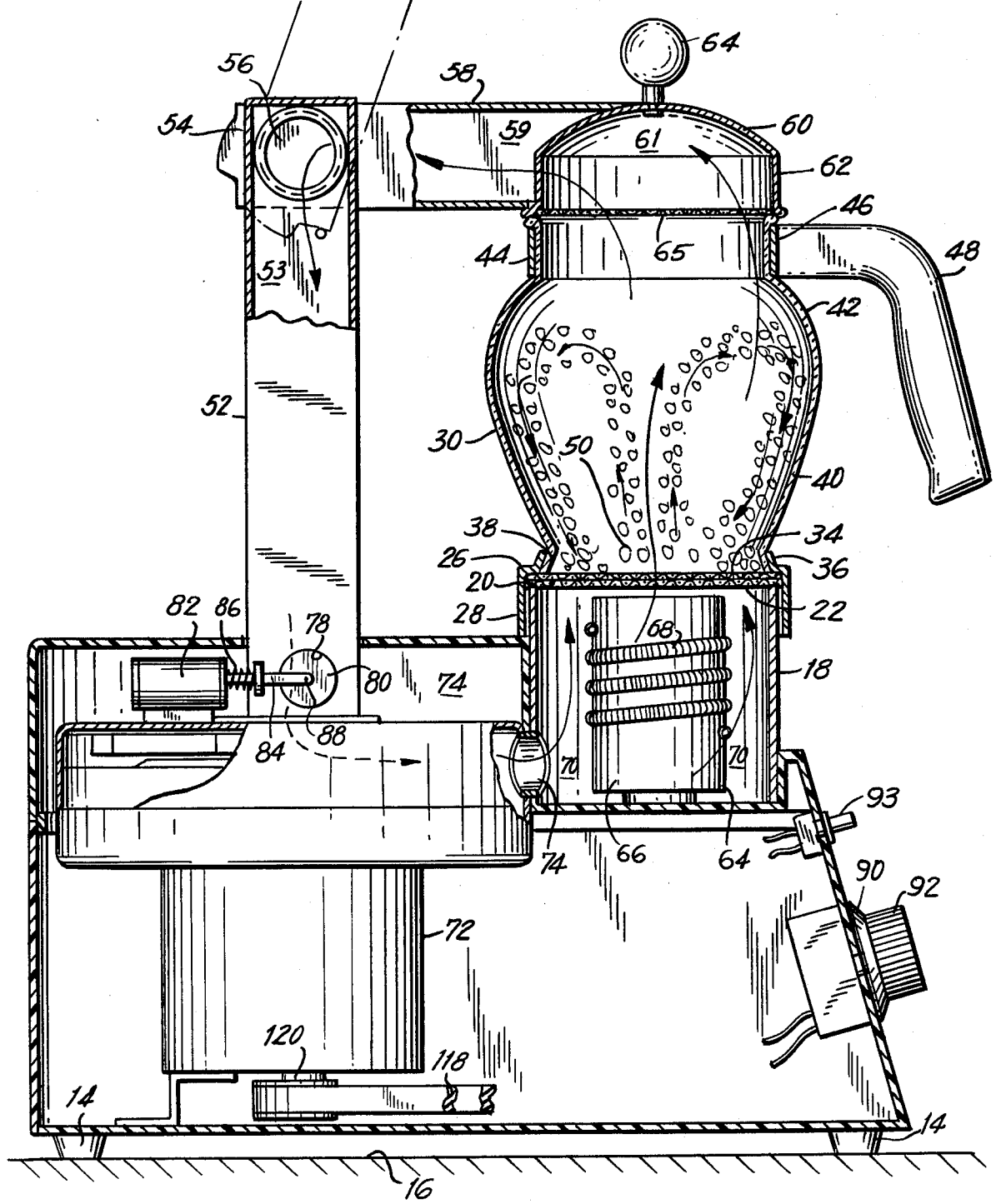
FIG. 3 is an elevational view partly in section taken along line 3—3 of FIG. 2.
Figure 4:
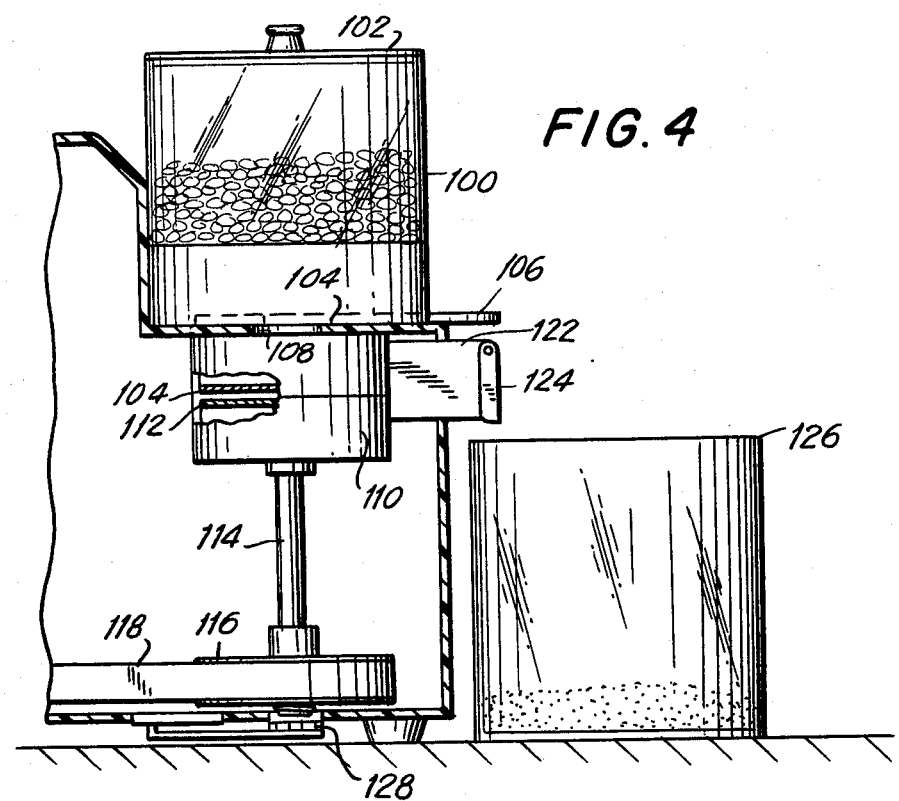
FIG. 4 is a sectional view taken along line 4—4 of FIG. 2.

A hollow column support member 52 defining an airflow passage 53 therein extends upwardly from base housing 12 from an area spaced rearwardly from support housing 18. At the upper end 54 of housing 52 is a pivot connection 56 within which is retained a hollow arm member 58 defining an airflow passage 59 therein. Arm member 58 terminates in a hollow somewhat rounded circumferential housing 60 defining an air passage or plenum 61 therein having a depending flange skirt segment 62 adapted to fit over the upper open end of vessel 30. Housing 60 includes an upstanding grasping ball 64 which may be grasped and utilized to pivot arm 58 from the solid line position shown in FIG. 3 to the broken line position. A snap-on chaff collecting screen 65 is fitted over the opening of housing 60 of sufficiently small mesh size to allow passage of air therethrough while trapping chaff which falls from the coffee beans during roasting. While this chaff collecting screen is preferably located over the upper open end of vessel 30 it is recognized that a chaff collecting screen could be interposed in the airflow stream at any other convenient location before the air returns to vessel 30.

Mounted within housing 18 is a heating element 64 which includes a core section 66 and a Nichrome heating wire 68 wrapped therearound. The heating element 64 is centrally disposed within housing 18 to provide an annular airflow passage 70 around the heating coil and up through the screens 22 and 34 into the bean retaining vessel 30.

A motor/blower 72 is also provided to direct a flow of forced air into an air passageway 74 which has its end 76 communicating through a wall of housing 18 with the annular air space 70 around the heating coil 68. Air passage 74 is in fluid communication with the air passage 53 within column 52 so that a closed loop air circulation passage is formed, when arm 58 is in the solid line position shown in FIG. 3, so that air forced by motor blower 72 flows through air passageway 74, the annular air passage 70, through the screens 22 and 34, through vessel 30 into housing 60 and through the air passage 59 in arm 58 to return through the air passage 53 in upstanding column support 52.

Near the base of upstanding support column 52 is an access port 78 which is covered by a rubber or flexible circular membrane 80. A solenoid valve 82 is mounted within housing 12 and includes an extending plunger arm 84 which is spring biased, for example, by a coil spring 86 to a normal at rest position with the plunger arm 84 of the solenoid in its extended position. The free end 88 of the plunger arm 84 is secured to the flexible membrane 80 so that when the solenoid arm 84 is in its extended position, membrane 80 completely covers access port 78 to maintain the closed loop airflow as described above. Upon energization of solenoid 82, solenoid arm 84 is retracted retracting membrane 80 to open access port 78 to allow airflow therethrough.

An on-off/time switch 90 is provided to actuate the coffee roaster of the present invention. Switch 90 is of the type which is actuated by rotation of an actuating knob 92 which initiates a timed "on" sequence depending upon the degree of rotation imparted to knob 92. For example, switch 90 may provide, at the discretion of the operator, with a running time of between four and twelve minutes of operation and would automatically disconnect at the end of the elapsed time of selected operation. An indicating light 93 is also provided which is lit when switch 90 is activated to provide a visual indication.

Figure 5:
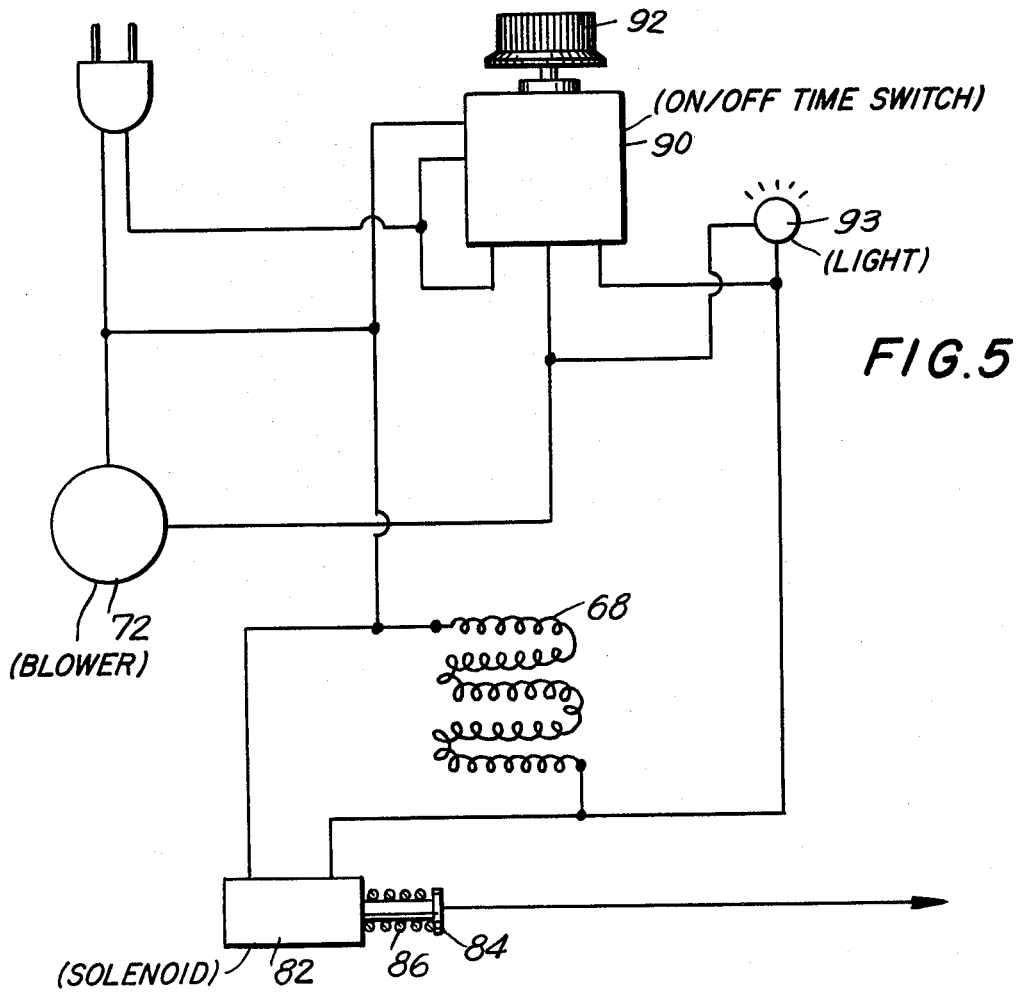
FIG. 5 is a schematic circuit diagram associated with the coffee roaster of the present invention.

Reference is made to FIG. 5 as well for a description of the roasting operation. When it is desired to roast a quantity of green coffee beans, arm 58 is pivoted upwardly to the broken line position shown in FIG. 3, and a quantity of beans are placed in vessel 30 and are retained therein by the screen 34. Vessel 30 is then placed in position on screen 22 within the retaining ring 24 and arm 58 is pivoted to the full line position so that housing 60 completely covers the upper opened end of vessel 30. Switch 90 is activated by turning knob 92 to an indicated period of time for the roasting operation which is selected by the operator depending upon the desired degree of roast to be imparted to the coffee beans.

In an initial phase of the roasting operation switch 90 activates motor blower 72 and heating coil 68 while maintaining solenoid 82 in its position to maintain access port 78 in a closed state. Coil 68, which is a resistance type heating element heats the air forced by blower 72 through the closed loop air circulation passage forcing the warmed air up through vessel 30 and recirculating the warmed air through the closed circulation loop as indicated by the arrows in FIG. 3. The air temperature is elevated by convection to a temperature of about 450° F. to below 530° F. and during this initial stage of the roasting operation is circulated in a closed loop. The force of the air is sufficient to fully levitate the beans 50 within vessel 30 and due to the shape of vessel 30 the beans rise generally vertically upwardly and follow a flow pattern to return by gravity in a generally outward path so that beans rise vertically toward the center of the vessel and fall back to the bottom of the vessel closer to the outer confines of the vessel. The force of the air moving upwardly through the vessel keeps the beans in a levitated and agitated state so that the beans are in constant movement and rotate during their movement. The glow from the coils 68 along with the flow of hot air passing over the beans heat the beans by radiation so that the beans achieve a uniform and consistent roast. In addition contact between the beans during levitation and agitation effects heat transfer between beans by conduction.

At the end of the desired roast cycle switch 90 disconnects heater element 68 and solenoid 82 from the circuit so that the solenoid armature 84 retracts pulling membrane 80 from access port 78. Blower motor 72 continues to operate so that cool ambient air is sucked into the air stream through access port 78 and is forced through vessel 30 in the same manner as the warmed air thus cooling the freshly roasted beans down to a temperature which is comfortable for subsequent handling. Timing switch 90 is preset so that the cooling cycle continues for a predetermined length of time, for example, 4 minutes, and at the conclusion of the cooling cycle switch 90 disconnects blower motor 72 so that the fresh roasted beans may be removed.

During the roasting operation the thin film covering on the green beans flakes off and is trapped as chaff in the mesh of the screen in place over the upper end of vessel 30. This screen may be removed and cleaned after each roasting operation. After the beans have cooled sufficiently to enable them to be safely handled, the beans may be ground in a coffee grinder and brewed as a coffee beverage.

An optional coffee grinder is provided within housing 12 for convenience and includes a bean retaining vessel 100 having a removable cover 102 thereon. Vessel 100 includes an access slot 104 in the bottom wall of the vessel within which is disposed a retractable slide member 106. An access port 108 is provided in the bottom wall of vessel 100 and with slide 106 fully inserted within access slot 104, the slide covers access port 108. With the beans to be ground in vessel 100 and in position over the coffee grinder 110, removal of the slide 106 permits beans within vessel 100 to fall into grinder 110. The grinder 110 is a conventional coffee grinder including a rotatable lower plate 112 having an upper serated surface spaced from a fixed upper serated plate 104. An access hole in registry with the access port 108 of beans retaining vessel 100 and in register therewith permits the beans to fall by gravity onto the upper surface of lower grinding plate 112. Plate 112 is fixed on a rotatable shaft 114 fixed to a drive wheel 116 which is driven by a belt 118 connected to an output shaft 120 of blower motor 72. Thus lower plate 112 is rotatably driven and the abrasive action imparted by the serated surface of the plates 104 and 112 grind the beans into coffee grinds which are forced out of chute 122, closed by a pivoting door 124 into a coffee holding vessel 126. The fineness of the grind can be adjusted by a screw adjustment 128 which controls the distance between the grinding plates 104 and 112.

It is thus seen that the present invention provides an effective roasting appliance suitable for uniformly roasting a desired quantity of coffee beans for immediate grinding and coffee brewing. A key operative feature of the device is the levitation of the coffee beans by a forced upward draft of heated air. Since coffee bean roasting is a function of time and temperature, the time of exposure is directly proportional to the degree of roast and may be controlled by timing the roasting cycle.

The clear transparent vessel provides a visual indication of the progress of the coffee bean roasting as an observer can visually see the evolution of the bean from a green unroasted condition to its roasted state by noting the color change from a light tan to darker and darker shades of brown.

Further, various types of beans of different sizes and density may be placed in vessel 30 to achieve a varied blend of coffee without the necessity of roasting the various coffee blends separately. Because the beans are levitated continuously during the roast cycle, the larger and/or denser varieties of coffee beans have a tendency to rise to a lesser degree than do the lighter smaller varieties. Thus, these denser beans remain closer to the radiating heat effect of flowing heater element 68. Experience with a variety of beans has shown that an effective roast can be achieved with the roaster of the present invention even with a variety of beans roasted at the same time. With experience an operator can achieve various coffee tastes by varying the length of coffee roast time from a relatively mild roast up to the darker "expresso" type roasts.

The present invention also provides a simple yet extremely effective chaff removal system. The bulk of the chaff is caught and trapped by the upper screen element but any minute pieces of chaff not screened here are precluded from returning to vessel 30 by the presence of screens 22 and 34. These screens combine to serve as an effective final screen to insure that chaff is not forced back into vessel 30 as the heated air is recirculated.

What is claimed is:

1. An apparatus for roasting coffee beans comprising, a vessel to contain coffee beans,
said vessel being open at each end,
screen means adapted to overlie at least the vessel bottom open end,
a blower means to supply air under pressure in a flow path passing upwardly through said vessel open ends to levitate and agitate coffee beans within said vessel,
heating means to heat the air prior to its passing through said vessel whereby said beans are levitated and rotated by said heated air to roast said coffee beans to a desired roast degree; and
wherein said vessel is shaped to provide an outwardly radiating configuration from said bottom end and then an inwardly radiating configuration toward said upper end to provide a generally bell-shaped configuration in cross-section thereby to provide a flow path for said coffee beans during levitation and agitation which is generally upwardly directed towards the center of said vessel and downwardly directed radially outwardly from the center of said vessel whereby said heated air circulating through said vessel effectively imparts a rotation to the levitating and agitating beans to uniformly roast said beans to a desired roast degree.

2. An apparatus as defined in claim 1 including means to circulate said air in a closed loop cycle.

3. An apparatus as defined in claim 2 including means associated with said means to circulate said air to disconnect said heating means and to admit cool ambient air to cool said coffee beans after the beans have been roasted to a desired roast degree.

4. Apparatus as defined in claim 1 wherein said vessel is of a clear transparent material to permit observation of the coffee beans during a roast cycle.

5. Apparatus as defined in claim 1 wherein said heating means includes a resistive heating element interposed within the path of air circulation to heat said air thereby to impart a degree of heating to said coffee beans by radiation.

6. An apparatus for roasting coffee beans comprising, a vessel to contain coffee beans,
said vessel being open at its bottom and top,
screen means adapted to overlie at least said bottom end,
a housing to support said vessel,
air blower means in said housing to supply air under pressure in a flow path passing through said vessel from said bottom to said top to levitate and agitate coffee beans within said vessel,
air return means operably associated with said apparatus to return air passing through said vessel to said heating means for recirculation through said vessel whereby said beans are levitated and rotated by said recirculating heated air to roast said coffee beans to a desired roast degree; and wherein said vessel is shaped to provide an outwardly radiating configuration from its open bottom to a point past the mid length of the vessel and then radiating inwardly toward its open upper end to provide a generally bell-shaped configuration in cross-section thereby to provide a flow path for said coffee beans during levitation and agitation of said beans which is generally upwardly directed towards the center of said vessel and downwardly directed radially outwardly from the center of said vessel.

7. Apparatus as defined in claim 6 wherein said air return means includes an upper housing disposed above said vessel upper end to direct the flow of air passing through said vessel through means defining an air passage for return to said blower means in said housing.

8. Apparatus as defined in claim 6 including screen means interposed in the path of air circulation after said air has passed through said vessel to collect and trap the chaff discharged by said coffee beans as they are roasted.

9. Apparatus as defined in claim 9 wherein said screen means for the collection of chaff is a screen overlying the top open end of said vessel.

* * * * *